United States Patent
Wang et al.

(10) Patent No.: US 11,521,007 B2
(45) Date of Patent: Dec. 6, 2022

(54) ACCELERATOR RESOURCE UTILIZATION BY NEURAL NETWORKS

(71) Applicant: International Business Machines Corporation, Armonk, NY (US)

(72) Inventors: Junsong Wang, Beijing (CN); Chang Xu, Beijing (CN); Tao Wang, Beijing (CN); Yan Gong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 16/792,353

(22) Filed: Feb. 17, 2020

(65) Prior Publication Data
US 2021/0256303 A1 Aug. 19, 2021

(51) Int. Cl.
G06N 20/10 (2019.01)
G06K 9/62 (2022.01)
G06N 3/08 (2006.01)
G06N 3/063 (2006.01)

(52) U.S. Cl.
CPC .......... *G06K 9/6232* (2013.01); *G06N 3/063* (2013.01); *G06N 3/08* (2013.01); *G06N 20/10* (2019.01)

(58) Field of Classification Search
None
See application file for complete search history.

(56) References Cited

U.S. PATENT DOCUMENTS

| | | | | |
|---|---|---|---|---|
| 10,664,310 B2* | 5/2020 | Bokhari | ................... | G06N 3/02 |
| 2018/0322386 A1 | 11/2018 | Sridharan | | |
| 2018/0341495 A1* | 11/2018 | Culurciello | .............. | G06N 3/08 |
| 2019/0042923 A1* | 2/2019 | Janedula | .............. | G06N 3/0445 |
| 2019/0042948 A1* | 2/2019 | Lee | ......... | G06N 3/0472 |
| 2019/0180170 A1* | 6/2019 | Huang | .............. | G06F 13/4068 |
| 2019/0187963 A1* | 6/2019 | Bokhari | ................ | G06F 9/4881 |
| 2019/0220734 A1* | 7/2019 | Ferdman | .............. | G06N 3/0454 |
| 2019/0370631 A1* | 12/2019 | Fais | ........... | G06F 8/31 |
| 2021/0019600 A1* | 1/2021 | Huang | .................... | G06F 13/28 |

(Continued)

OTHER PUBLICATIONS

Geng et al., "A Scalable Framework for Acceleration of CNN Training on Deeply-Pipelined FPGA Clusters with Weight and Workload Balancing",Jan. 7, 2019,20 pps., arXiv:1901.01007, 2019, < https://arxiv.org/pdf/1901.01007.pdf>.

(Continued)

*Primary Examiner* — Tsung Yin Tsai
(74) *Attorney, Agent, or Firm* — Stephanie L. Carusillo

(57) ABSTRACT

A method for configuring a set of hardware accelerators to process a CNN. In an embodiment, the method includes one or more computer processors determining a set of parameters related to a feature map to analyze at a respective layer of the CNN, the set of parameters include quantization value and respective values that describe a shape of the feature map. The method further includes configuring a set of hardware accelerators for the respective layer of the CNN. The method further includes receiving a portion of the feature map to the configured set of hardware accelerators for the respective layer of the CNN, wherein the received portion of the feature map includes a group of sequential data slices. The method further includes analyzing the group of sequential data slices among the configured set of hardware accelerators.

17 Claims, 5 Drawing Sheets

(56) References Cited

U.S. PATENT DOCUMENTS

2021/0256303 A1* 8/2021 Wei ..................... G06K 9/6232

OTHER PUBLICATIONS

Venieris et al., "f-CNNx : A Toolflow for Mapping Multiple Convolutional Neural Networks on FPGAs", 28th International Conference on Field Programmable Logic and Applications (FPL), 2018, IEEE, 8 pps., <https://arxiv.org/pdf/1805.10174.pdf>.
Wei et al., "TGPA: Tile-Grained Pipeline Architecture for Low Latency CNN Inference", Proceedings of the International Conference on Computer-Aided Design, ICCAD '18, Article No. 58, 2018, ACM, 8 pps., <http://vast.cs.ucla.edu/sites/default/files/publications/PID5488167.pdf>.
Zhang et al., "DNNBuilder: an Automated Tool for Building High-Performance DNN Hardware Accelerators for FPGAs", Conference Paper—Nov. 2018 DOI: 10.1145/3240765.3240801, uploaded on Nov. 7, 2018, 8 pps., <https://www.researchgate.net/publication/328784456_DNNBuilder_an_Automated_Tool_for_Building_High-Performance_DNN_Hardware_Accelerators_for_FPGAs/link/5be2e2259285 1c6b27ad918b/download>.

* cited by examiner

US 11,521,007 B2

ACCELERATOR RESOURCE UTILIZATION BY NEURAL NETWORKS

BACKGROUND OF THE INVENTION

The present invention relates generally to the field of data processing, and more particularly to configuring accelerators to process data within a convolutional neural network.

Artificial neural networks (ANNs) are systems that can "learn" to perform tasks without being programmed with task-specific rules. ANNs are utilized by various artificial intelligence (AI) tasks or machine learning, such computer vision, speech recognition, machine translation, medical diagnosis, classifying, etc.

Convolutional neural networks (CNNs) are a class of deep neural networks. CNNs are regularized versions of multi-layer perceptrons (e.g., fully connected networks), where each neuron in one layer is connected to all neurons in the next layer. CNNs take advantage of hierarchical patterns in data and assemble more complex patterns using smaller and simpler patterns. For example, a CNN breaks down images into small patches (e.g., 5×5 pixel patch), then moves across the image by a designated stride length (i.e., increment). Therefore, on the scale of connectedness and complexity, CNNs are on the lower extreme. CNNs use relatively little pre-processing compared to other classification algorithms, allowing the network to learn the filters that were hand-engineered in traditional algorithms. CNNs can improve the performance of autonomous vehicle control, bioinformatics, image and video recognition, image classifications, natural language processing (NLP), etc. CNNs are also known as "shift invariant" or "spatially invariant" artificial neural networks.

In addition, computer systems can be configured to include various hardware accelerators that can include specialized designed integrated circuits (ICs), such as graphic processor units (PGUs) and application specific integrated circuits (ASICs); and/or dynamically configurable integrated circuits, such as field-programmable gate array (FPGAs) to improve the execution and performance of models, algorithms, and custom functions utilized by aspects of the CNN.

SUMMARY

According to an aspect of the present invention, there is a method, computer program product, and/or computer system for configuring a set of hardware accelerators to process a CNN. In an embodiment, the method includes at least one computer processor determining a set of parameters related to a feature map to analyze at a respective layer of the CNN, wherein the set of parameters related to the feature map includes a quantization value; and respective values for a first dimension, a second dimension, and a third dimension, which correspond to a shape describing the feature map. The method further includes at least one computer processor configuring a set of hardware accelerators for the respective layer of the CNN. The method further includes at least one computer processor receiving a portion of the feature map to the configured set of hardware accelerators for the respective layer of the CNN, wherein the received portion of the feature map includes a group of sequential data slices. The method further includes at least one computer processor analyzing the group of sequential data slices among the configured set of hardware accelerators.

DETAILED DESCRIPTION

Figure 1:
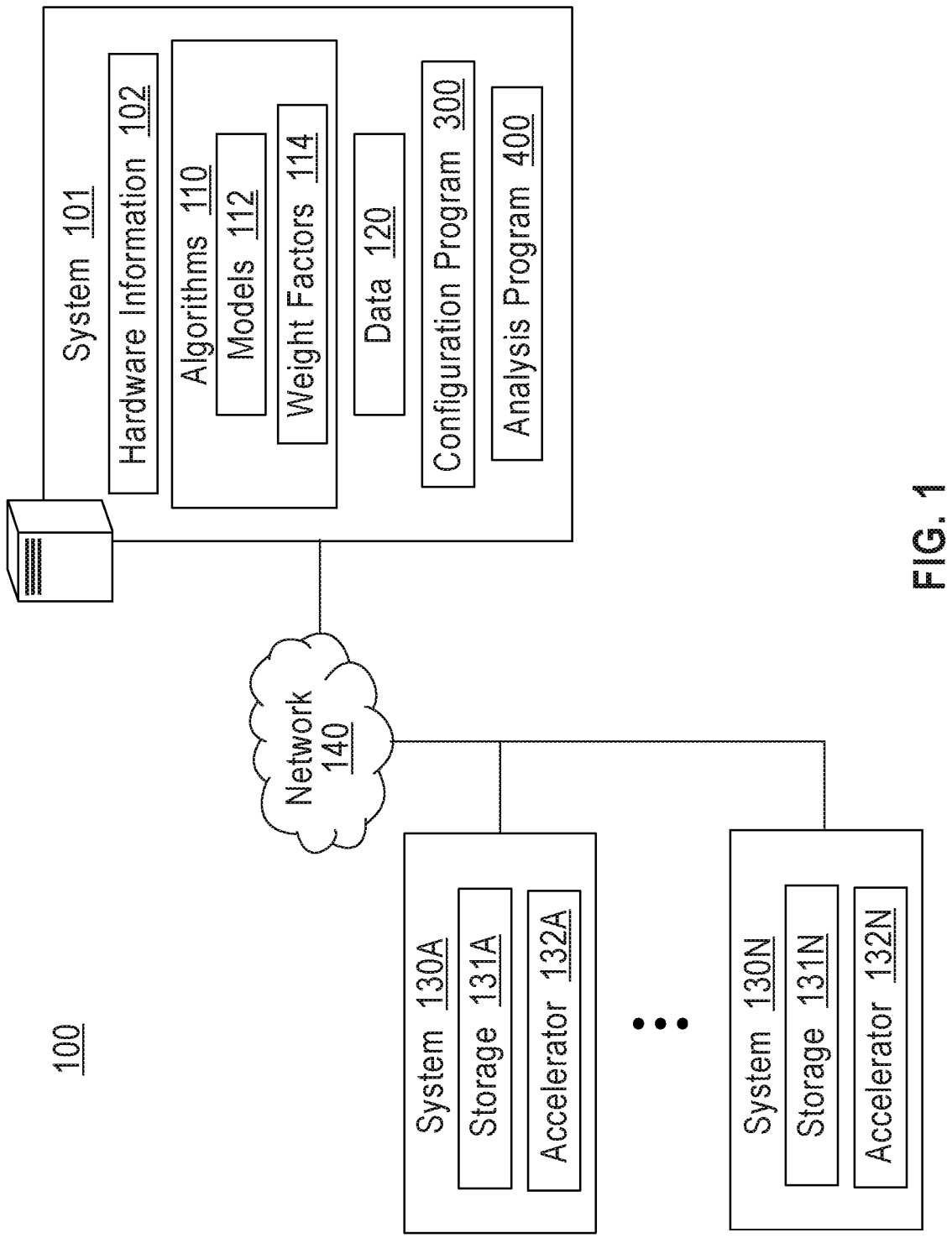
FIG. 1 illustrates a computing device environment, in accordance with an embodiment of the present invention.

Embodiments of the present invention recognize that convolutional neural networks (CNNs) consist of an input and an output layer, as well as multiple hidden layers. The hidden layers of a CNN can consist of a series of convolutional layers that convolve data utilizing matrix math or other dot product operation. Convolution is a specialized kind of linear operation. CNNs are simply neural networks that use convolution in place of general matrix multiplication in at least one of their layers. To improve the execution of a CNN, various accelerators are used to process various aspects of the CNN, such as calculation, comparisons, filtering, etc., that occur among the neurons (e.g., nodes) of the CNN as opposed to utilizing general purpose computer processors to performing the calculations associated with the models and algorithms of the CNN.

Embodiments of the present invention also recognize that utilizing a single accelerator constrains the total memory and computational capabilities available to a CNN. As used herein, accelerators can refer to field-programmable gate array (FPGAs), graphic processor units (GPUs), dynamically configurable integrated circuits, application specific integrated circuits (ASICs), and/or modules and adapter cards that include one or more of the aforementioned integrated circuits. Various integrated circuits of an accelerator include on-chip memory, cache memory for storing model and weight factors associated with the algorithms of the CNN, and process elements (PEs) that execute matrix-math operations and other calculations of a CNN model.

Embodiments of the present invention also recognize that in large computing system architectures and cloud computing environments that various parallelism architectures involving a plurality of accelerators can be created to significantly reduce the inference time associated with a CNN. Embodiments of the present invention recognize that some current parallelism architectures map a subnetwork of the CNN into a dedicated accelerator and then pipelines the accelerators together. A CNN may include various types of layers, such as convolutional layers, ReLU (rectified linear unit) layers, pooling layers, concatenation layers, etc.

However, embodiments of the present invention recognize that such a parallelism architecture produces long latencies that increase linearly with the number of layers of the CNN where accelerators associated to later layers of the CNN remaining idle for an extended period of time. Further, embodiments of the present invention recognize each accelerator requires significant on-chip memory to buffer the data assigned and/or shared with each accelerator, especially for high resolution data, data consisting of large number of elements, and/or data that is "deep" (e.g., includes a plurality of physical levels, virtual levels, levels based on a modification by a filter or other function, and/or a plurality of channels). For example, an image or a feature map of shape (i.e., dimensions): (640 [pixels wide] *360 [pixels high] *64 levels [deep]) at 16-bit quantization (e.g., resolution) would require a buffer of more than 29 MB of on-chip memory. In addition, embodiments of the present invention recognize that when large data sets, images, etc., are communicated to an accelerator, the accelerator can become memory-constrained and a significant percentage of process elements of the accelerator are unused.

Embodiments of the present invention provide a solution to improve the utilization of on-chip memory and PE resources of accelerator in addition to reducing the latency associated with pipelining information among the neuron/layers of a CNN. Embodiments of the present invention determine the capabilities of a plurality of accelerators available to a CNN to process data and configure the accelerators, pipelining, and other computing resources to utilize a fine-grained row/column buffering and pipelining scheme to further utilize inner pipeline features inside the layers of a CNN (described in further detail with respect to FIG. 2). In addition, embodiments of the present invention can configure accelerators differently for each layers of a CNN. For example, the "depth dimension", number of levels, number of filters associated with the original data and intermediate feature maps can vary among the plurality of layers of a CNN. In addition, the kernel size and stride increment can vary between layers of the CNN.

Embodiments of the can reduce the on-chip memory requirements for an accelerator by more than 90% for some feature maps (e.g., data) based on the size of the kernel (e.g., convolutional matrix, mask, etc.) and associated stride increment. Some embodiments of the present invention utilize vertical and horizontal stride increments that are the same. In various embodiments, the stride increment is further related to the kernel size, such as stride=1 is commonly used with 1×1 or 3×3 kernel, and stride=2 is commonly used with a 5×5 kernel. For example, based on the previously described feature map dimensions (e.g., shape), and utilizing a 3×3 kernel with stride=1, an accelerator can begin processing the feature map after loading only four (i.e., 3+1) "slices" (e.g., a subset) of the data, which requires a buffer of approximately 184 KB of on-chip memory (e.g., 4 [slices] *360 [high] *64 [levels] and 16-bit quantization). Further, in response to incrementing the kernel processing to the next group of data slices (e.g., columns of feature map elements n-levels deep) by a horizontal stride increment, a stride increment number of processed data slices of memory are cleared or released from an on-chip memory buffer to enable one or more subsequent slices of data to be received for processing. Slices, data slices, and slices of data may be used herein interchangeably.

Similarly, embodiments of the present invention reduce the latency between layers of the CNN by pipelining data to another accelerator after each slice or group of slices are affected by the kernel. In one scenario, if the shape of the feature map does not change between layers N and N+1 of the CNN, then an accelerator assigned to layer N+1 of the CNN can begin processing after less than 2% of the data is buffered to or processed by the accelerator associated with layer N of the CNN. For example, slices 4, 5, 6, and 7 are buffered and processing within an accelerator assigned to layer N while slices 1!, 2!, 3!, and 4! are buffered and begin processing within an accelerator assigned to layer N+1 of the CNN. Because intermediate feature maps can be shared and/or duplicated among neurons of the CNN and processing speeds can vary, data transfers are asynchronous. For example, features (e.g., elements) within one slice of data within one accelerator of a subsequent CNN layer may be comprised of the other features generated by a plurality of accelerators assigned to processing the prior layer of the CNN.

Embodiments of the present invention also distribute each level of data within a group of slices to a different PEs of an accelerator for processing utilizing a respective kernel matrix or mask, herein generally referred to as a kernel. In the case of FPGAs, the PEs of an accelerator can be uniquely configured (e.g., temporarily hardcoded) with the kernel and related operations assigned to a level of data or a feature map. In the case non-programmable PEs, a kernel can be stored within the cache associated with data processing functions, such as i-cache.

Some embodiments of the present invention can further reduce the latency with processing the plurality of layers of a CNN by processing different CNN layers within an adapter-card type accelerator that included multiple FPGA, GPUs, etc., and utilizing internal communication architectures to improve data pipelining. Similarly, embodiments of the present invention can identify systems that include multiple accelerators that also include interfaces that reduce latency by utilizing protocols that do not require the main processor of a system to facilitate transfers of data between accelerators. Examples of interfaces that can improve data pipelining between accelerators are accelerator adapter cards that include coherent accelerator processor interface (CAPI), or non-volatile memory express host controller (NVMe) technologies.

One skilled in the art would recognize that by reducing memory requirements of accelerators, increasing the percentage of PEs of an accelerator that process data for a CNN, and reducing that latency between layer of a CNN, an IT system is improved. Further, by automating the configuring of accelerators utilized by a CNN based on determining the capabilities of accelerators and the systems that include the accelerators, the present invention is integrated within a practical application.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating distributed computing environment 100, in accordance with embodiments of the present invention. In an embodiment, distributed computing environment 100 includes: system 101 and system 130A through system 130N, all interconnected over network 140. In another embodiment, distributed computing environment 100 represents a cloud computing environment where one or more of system 130A through system 130N can be located at different geographic locations. Many modifications to the depicted environment may be made by those skilled in the art without departing from the scope of the invention as recited by the claims.

System 101 and system 130A through system 130N may be: laptop computers, tablet computers, netbook computers, personal computers (PC), desktop computers, personal digital assistants (PDA), smartphones, wearable devices (e.g., digital eyeglasses, smart glasses, smart watches, personal fitness devices, etc.), or any programmable computer systems known in the art. In certain embodiments, system 101 and system 130A through system 130N represent computer systems utilizing clustered computers and components (e.g., database server computers, application server computers, storage systems, network routers, etc.) that act as a single pool of seamless resources when accessed through network 140, as is common in data centers and with cloud-computing applications. In general, system 101 and system 130A through system 130N are representative of any programmable electronic device or combination of programmable electronic devices capable of executing machine readable program instructions and communicating via network 140. System 101 and system 130A through system 130N may include components, as depicted and described in further detail with respect to FIG. 5, in accordance with embodiments of the present invention.

In an embodiment, system 101 includes hardware information 102, algorithms 110, data 120, configuration program 300 and analysis program 400. System 101 may also include various programs and data, such as a hypervisor; a visualization suite; one or more network daemons; network communication programs; a network map; and various functions and/or algorithms to perform various statistical, analytical, and predictive determinations (not shown). For example, system 101 includes programs and functions that can trace and determine structures (e.g., layers and data sizes) utilized by a CNN and the timing and latency of data processing and data pipelining among accelerators within distributed data environment 100.

In various embodiments, system 101 can dynamically segment and transmit data within data 120 based on the availability of resources and computing time among system 130A through system 130N. System 101 can also transmit, pre-emptively or dynamically transmit copies of models and weight factors (e.g., weight values) within models 112 and weight factors 114 to system 130A through system 130N based on the portion of data 120 and one or more CNN layers assigned to respective accelerators 132A through 132N.

In an embodiment, hardware information 102 includes information related to the computing resources of system 130A through 130N, such as respective storage types and sizes within a system; the configuration of the system, such as number and capabilities of included accelerators, network communication capabilities (e.g., protocols, bandwidth, etc.); and availability of the resources of a respective system, such as computer processors/cores and memory. Hardware information 102 may also identify accelerators, storage devices, and/or networking hardware, which include features that enhance data transfer, such as CAPI and NVMe technologies. In some embodiments, hardware information 102 includes a network map and respective historic latencies among system 101 and system 130A through system 130N based on previous analyses associated with respective layers of one or more CNNs.

In an embodiment, algorithms 110 includes one or more CNNs, machine learning programs, and/or other neural network programs (e.g., transferrable neural networks algorithms and models (e.g., long short-term memory (LSTM), deep stacking network (DSN), deep belief network (DBN), compound hierarchical deep models, etc.). Algorithms 110 also includes respective models 112 and weight factors 114 that corresponds to each layer and/or process step of a CNN or other program included within algorithms 110. In some embodiments, algorithms 110 include other information related to a CNN, such structures (e.g., number of layers, types of layers, number of neurons or nodes/layer); changes to input data; changes associated with the dimensions and resolution of intermediate feature map at a CNN layer; etc.

In an embodiment, the plurality of models included within models 112 and the plurality of weights included within weight factors 114 also are associated with respective program or data sizes (e.g., memory requirements) that at least configuration program 300 can utilize in determining how to configure a set of hardware accelerators utilized by a CNN and the number of accelerators to configure for a respective CNN layer. In other embodiments, one or more items included within models 112 and/or weight factors 114 can be modified and/or created by training or refitting related to executing a machine learning program (not shown) that is further associated with the CNN.

In an embodiment, data 120 represents data for analysis by a CNN, such as image data, dialog, audio recordings, seismic data, data to classify, etc. In another embodiment, data 120 represents real-time or streaming data for processing by a CNN. In various embodiments, data 120 also includes data utilized by a CNN for comparison purposes and/or additional training or machine learning by the CNN. In some embodiments, data 120 includes a plurality of data segments for analysis that has been generated from a larger data set. In various embodiments, data 120 or segments of data 120 include metadata associated with the plurality of feature map elements (e.g., data) that indexes data 120 or the segments of data 120 along at least the width dimension (e.g., X-axis) of the data. A width-based index value can be used to describe a number of columns or slices within the data.

Configuration program 300 is a program for determining and configuring computing resources, such as accelerators to process and/or analyze data utilizing a CNN. In an embodiment, configuration program 300 determines a set of requirements for a CNN and information associated with the data (e.g., data 120) to analyze utilizing the CNN. In some embodiments, configuration program 300 communicates with a plurality of network-accessible computing systems, such as system 130A through 130N and determines the availability and capabilities of one or more accelerators and other computing resources included within a network-accessible computing system. In other embodiments, computing systems of distributed computing environment 100 periodically transmit information related to the availability and capabilities of respective computing resources of a computing system, such as system 130A.

Configuration program 300 configures a plurality of accelerators distributed among the computing systems of distributed computing environment 100 to process and/or analyze data utilizing models and weight factors related to one or more layers of a CNN. In an embodiment, configuration program 300 utilizes one or more programs within system 101 to segment or partition the data for analysis (e.g., data 120) and distributes the data segments among the configured accelerator included within system 130A through 130N.

In various embodiments, configuration program 300 determines and configures sets of accelerators (e.g., allocates on-chip memory buffers, assigns PEs, etc.) respectively associated with layers of a CNN based on a fine-grained row/column buffering scheme that stores only a portion of the data to process, and the number and size of data segments to process. In addition, configuration program 300 also identifies and distributes the models and related weight factors corresponding to layers of the CNN based on the distributed data segments and structure of the CNN. In an embodiment, configuration program 300 initiates the execution of the CNN.

In a further embodiment, configuration program 300 can utilize other information associated with network 140 and system 130A through 130N to make various determinations and hardware assignments. In one example, if a set layers of a CNN can execute quickly based on historic execution information and process small data segments, then configuration program 300 may assign this set of layers to a system that include accelerators with a large number of process elements to pipeline data processing within a smaller group of accelerators. In another example, if a layer of the CNN processed large volumes of data, then configuration program 300 may assign this layer of the CNN to accelerators that includes technologies that reduce latencies and improve bandwidth while minimizing the demands on the processors of the hosting system.

Analysis program 400 controls the receipt and analyses of data among a plurality of accelerators configured by configuration program 300 to process one or more layers of a CNN. In some embodiments, analysis program 400 implements a fine-grained row/column buffering and pipelining scheme among the plurality of configured accelerators based on the structure of the CNN, and parameters and dictates corresponding to layers of the CNN, such as a dimensions of a feature map, a kernel size, a stride increment value, etc. For example, analysis program 400 dictates the number of data slices received to an assigned accelerator based on a kernel size and a stride increment. Subsequently, analysis program 400 utilizes PEs of an accelerator to process sets of elements of the feature map (e.g., processed data) within a group of data slices utilizing one or more kernels, models and weight factors related to a layer of the CNN.

In response to analyzing a group of data slices, analysis program 400 pipelines analyses and/or intermediated feature maps to one or more nodes of a subsequent layer of the CNN. In various embodiments, analysis program 400 clears (i.e., dequeues) and releases buffer memory of an accelerator corresponding to a stride increment number of sequential data slices (e.g., lowest index value). Analysis program 400 modifies an analysis interval by a stride increment value and analyzes another group of data slices. In addition, if additional unprocessed data slices are available, analysis program 400 receives a stride increment value number of sequential unprocessed data slices to an accelerator for processing.

In an embodiment, system 130A through system 130N are representative of a plurality of computing systems. A system (e.g., system 130A through system 130N) includes respective instances of storage 131 (e.g., storage 131A through storage 131N) and one or more respective accelerators (e.g., accelerator 132A through accelerator 132N). System 130A through 130N may also include various programs and data, such as a hypervisor, virtualization software, a system management facility (SMF), communications programs, one or more operating systems, etc. (not shown). For example, system 130A through system 130N include software utilized to program FPGAs related to instance of accelerator 132A. Similarly, system 130A through system 130N may include software utilized manage one or more accelerators based on dictates of system 101 and/or the structure of the executing CNN. System 130A through system 130N may also include various other hardware and software resources utilized by aspects of the present invention. In various embodiments, one or more of system 130A through system 130N can represent other data processing elements either physical or virtual, such as blade servers, rack-mounted servers, software defined computing nodes, virtual machines, etc.

In an embodiment, storage 131A through storage 131N are representative of a combination of persistent storage, such as hard drives and flash drives; and volatile storage, such as DDR memory (e.g., double data rate dynamic random-access memory) included within respective system 130A through system 130N. In various embodiments, storage 131A through storage 131N are utilized to store one or more aspects of a CNN (e.g., algorithms, models, weight factors, etc.), data to process by the CNN, and/or intermediate feature maps/results generated by one or more layers of the CNN. In one example, storage 131A receives, from system 101, a portion of data 120 to be processed by accelerator 132A and the algorithms, models, and weight factors related to the first layer of a CNN. In another example, storage 131N stores the algorithms, models, and weight factors related to the last layer of the CNN received from system 101 and the portion of the output of the final layer of the CNN generated by accelerator 132N.

In some embodiments, a system, such as system 130A includes a plurality of instances of accelerator 132A, such as accelerator 132A-1 through 132A-30 (not shown). In some scenarios, the plurality of instances of accelerators 132A-1 through 132A-30 included within system 130A are of a homogeneous hardware configuration, such as the same adapter card model from the same manufacturer, the same amount of DDR memory, the same FPGAs, etc. In other scenarios, one or more accelerators of accelerators 132A-1 through 132A-30 differ from other accelerators within system 130A. In another example, accelerators 132A-1 through 132A-10 are based on FPGAs of one manufacturer, accelerators 132A-11 through 132A-20 are based on two or more models of GPUs. Instances of an accelerator may include components, as depicted and described in further detail with respect to FIG. 5

FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, system 101 and system 130A through system 130N communicate via network 140. Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 101 and system 130A through system 130N, in accordance with embodiments of the present invention. In various embodiments, network 140 operates locally via wired, wireless, or optical connections and can be any combination of connections and protocols (e.g., personal area network (PAN), near field communication (NFC), laser, infrared, ultrasonic, etc.). In some embodiments, a portion of network 140 represents a communication architecture within a larger computing system (not shown) that includes one or more of system 130A through system 130N (e.g., blade servers, rack mounted servers, etc.).

Figure 2:
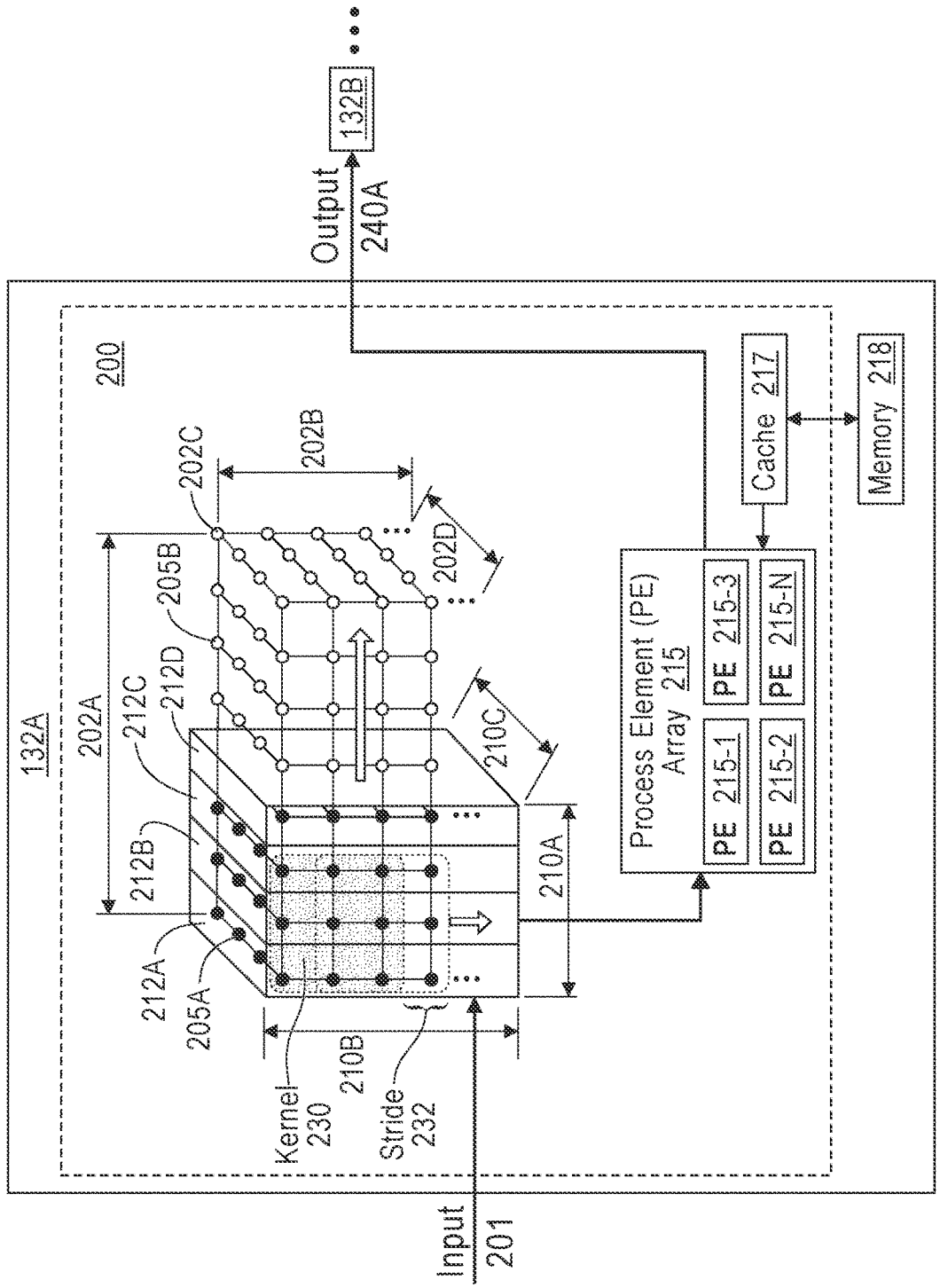
FIG. 2 illustrates aspects of a hardware acceleration and associated memory utilization to process data, in accordance with an embodiment of the present invention.

FIG. 2 is an illustrative example of aspects of one or more accelerators included within system 130A through system 130N utilized to practice various embodiments of the present invention. Accelerator 132A is representative of an of accelerator that processes data for a layer of a CNN (not shown), such as layer N. In an embodiment, accelerator 132A includes process element (PE) array 215, cache 217, memory 218, and a plurality of physical and virtual items depicted within long-dashed box 200, such as data slice 212A.

In an embodiment, accelerator 132B is representative of one or more other accelerators. In another embodiment, accelerator 132B represents another portion of accelerator 132A configured for processing layer N+1 of the CNN by directly receiving an intermediate feature map/results generated by accelerator 132A for processing layer N of the CNN. Accelerator 132B is related to a subsequent processing layer of the CNN, such as layer N+1. In some embodiments, accelerator 132B represents a combination of the above embodiments.

In the illustrative example embodiment, long-dashed box 200 represents on-chip features, such as process element (PE) array 215, cache 217, and a representation of an allocated memory buffer (e.g., the cube) that includes slices 212A, 212B, 212C, and 212D. In an embodiment, the depicted buffer is a FIFO buffer (i.e., first in, first out). In some embodiments, accelerator 132A includes a plurality of instances of long-dashed box 200 and respective components based on the quantity of PEs and memory included within an IC chip (not shown) of accelerator 132A. An IC chip represented by or included within accelerator 132A may include: an FPGA, a GPU, an application-specific integrated circuit (ASIC), a programmable logic array, or other programmable integrated circuit known in the art. Long-dashed box 200 also includes a plurality of non-hardware items related to accelerator 132A.

In one embodiment, input 201 is representative of a stream of data corresponding to a portion of data 120 (e.g., an initial feature map) to be analyzed by a first layer of a CNN utilizing accelerator 132A. In another embodiment, input 201 is representative of one or more intermediate feature maps/results generated by the prior layer of a CNN. In some scenarios, input 201 is another intermediate feature map related to an analysis performed by a different portion (e.g., another PE array 215, another portion of cache 217, and another portion of memory 218) of accelerator 132A. In other scenarios, input 201 is representative of intermediate feature maps/results related to an analysis performed by one or more different accelerators, such as accelerator 132C and accelerator 132D (not shown) for the prior layer of the CNN (i.e., layer N−1) and pipelined to accelerator 132A.

In various embodiments, the portion of data 120 assigned accelerator 132A is represented by the plurality of instances of data element 205A (solid circles) and the plurality of instance of data element 205B (unfilled circles). In the depicted example, instances of data element 205A represent data received to a memory buffer of accelerator 132A (e.g., represented by the cube that includes data slices 212A, 212B, 212C, and 212D). The plurality of instances of data elements 205B represent data assigned to accelerator 132A not yet received via input 201.

In one embodiment, the size (in bits) of the portion of data assigned to accelerator 132A for processing is equal to the product of the values related to items 202A, 202B, 202C, and 202D. In one example, input 201 represents an assigned segment of an image or a feature map and the plurality of data elements 205A and 205B represent pixels associated with the assigned image segment or feature map. Items 202A and 202B represent the respective width (X-axis or number of columns) dimension and height (Y-axis, or number of rows) dimension, in pixels, of the assigned image segment. The illustrative example depicts a feature map eight elements wide. The value associated with item 202C represents the quantization (i.e., resolution) in bits of the pixels (e.g., plurality data elements 205A and 205B) associated with the assigned data. In an embodiment, the value of item 202D (e.g., Z-axis or depth dimension) represents the number of levels within the assigned/received data or feature map. For example, each depth level or Z-axis increment (e.g., respective XY planes) can represent differing filters applied to the assigned image segment, different depths associated with an assigned 3-D image segment, or another data manipulation associated with the CNN. The illustrative example depicts four depth levels or Z-axis increments (e.g., item 202D).

In the illustrative example, kernel 230 (speckle filled, rounded corner box) represents a 3×3 matrix. Stride 232 indicates an analysis increment value of one. Instances of kernel 230 are utilized by the CNN to perform various operations based on the values included within a kernel's matrix, such as identify, edge detection, sharpen, gaussian blur, etc. In an embodiment, the number of data slices (e.g., YZ plane arrays of elements 205A) is equal to the width-value of kernel 230 plus the increment value of stride 232. In the illustrative example, the number of data slices associated with accelerator 132A equals 4 (i.e., data slices 212A, 212B, 212C, and 212D). In addition, each slice or YZ (e.g., height/depth) plane can be related to the width-based (e.g., X-axis) index values associated with feature map/data elements.

In various embodiments, each depth level (i.e., Z-axis increment or index) is assigned a respective instance of kernel 230 (not shown), which can be the same matrix or matrices of the same size, but differing values based on the models utilized by the CNN. In the illustrative example, respective instances of kernel 230 preform analyses of data elements 205 within respective XY (e.g., width/height) planes of data within sequential sets of data slices, such as data slices 212A, 212B, and 212C. In an embodiment, accelerator 132A assigns a number of process elements (PEs) of PE array 215 equal to a value for the number of Z-axis levels (e.g., value of item 202D) corresponding to the data assigned to accelerator 132A. Utilizing separate PEs, accelerator 132A can concurrently perform groups of analyses.

In the illustrative example, the downward pointing vertical arrow associated with kernel 230 and stride 232 indicates the direction of the stride increment and analysis of enclosed instances of data elements 205A included within an area bounded by an instance of kernel 230. For example, the first group of analyses associated with instances of kernel 230 includes the uppermost three instances of data element 205A (e.g., $1^{st}$, $2^{nd}$, and $3^{rd}$ data elements) within each 3×3 group of data elements included within data slices 212A, 212B, and 212C within respective Z-axis levels. The next group of analyses increments the instances of kernel 230 to include the next three instances of element 205A within each subsequent 3×3 group (e.g., a subset of the rows and columns) of data elements within respective depth level (i.e., Z-axis increment or index) based on the increment value of stride 232 (e.g., $2^{nd}$ $3^{rd}$, and $4^{th}$ data elements of data slices 212A, 212B, and 212C).

In an embodiment, in response to processing each feature map/data element within data slices 212A, 212B, and 212C, accelerator 132A pipelines the plurality of results (represented by output 240A) to another accelerator, such as accelerator 132B. Subsequently, accelerator 132A releases/clears the on-chip memory storing data slice 212A (discussed in further detail with respect to FIG. 4). In the illustrated example, the horizontal arrow represents the buffering direction for subsequent data slices, such as data slice 212E (not shown). In addition, accelerator 132A resets the analysis index (e.g., position) of the respective instances of kernel 230 to analyze, unidirectionally the uppermost three instances of data element 205A included within each data level of data slices 212B, 212C, and 212D. For example, in response to analyzing each instance of data element 205 within each data level of slices 212A, 212B, and 212C, kernel 230 performs the next set of analyses starting with the 1st, 2nd, and 3rd data elements within data slices 212B, 212C, and 212D.

PE array 215 represents a plurality of physical computational structures (e.g., PE 215-1, PPE 215-2, PE 215-3 through PE 215-N) within an IC (not shown) of accelerator 132A. PEs of PE array 215 are operatively couple and assigned memory from cache 217. Based on the illustrative example, accelerator 132A assigns four process elements: PE 215-1, PE 215-2, PE 215-3, and PE 215-4 (not shown) to process the data assigned to accelerator 132A.

Cache 217 is on-chip memory included within an IC of accelerator 132A. In an embodiment, a portion of memory of cache 217 assigned to a PE can be configured as i-cache (i.e., instruction cache) that can include one or more computational models for a layer of a CNN. Another portion of the memory assigned to a PE can be configured as d-cache (i.e., data cache), which stores at least one or more weigh values, received from system 101, and associated with a model of the CNN. In some embodiments, another portion of cache 217 utilizes a double buffering method (e.g., a ping-pong buffer scheme) to swap weight factors between on-chip memory and off-chip DDR memory, represented by memory 218.

In one embodiment, memory 218 represents DDR memory included on an accelerator module or accelerator adapter card. In another embodiment, memory 218 represents DDR memory associated with memory included within storage 131A of system 130A. In various embodiments, memory 218 stores at least the weight factors associated with the models corresponding to a layer of the CNN that is processes by accelerator 132A. In some embodiments, with respect to machine learning, memory 218 includes modified weight factors based on training or refitting one or more models of the CNN and updating weight factors 114.

In the illustrative example, output 240A is representative of intermediate feature map generated by accelerator 132A and pipelined to at least accelerator 132B. In some embodiments, the ellipsis after accelerator 132B represents one or more subsequent layers of the CNN, such as layers N+2 and N+3 and respectively assigned and configured accelerators.

Figure 3:
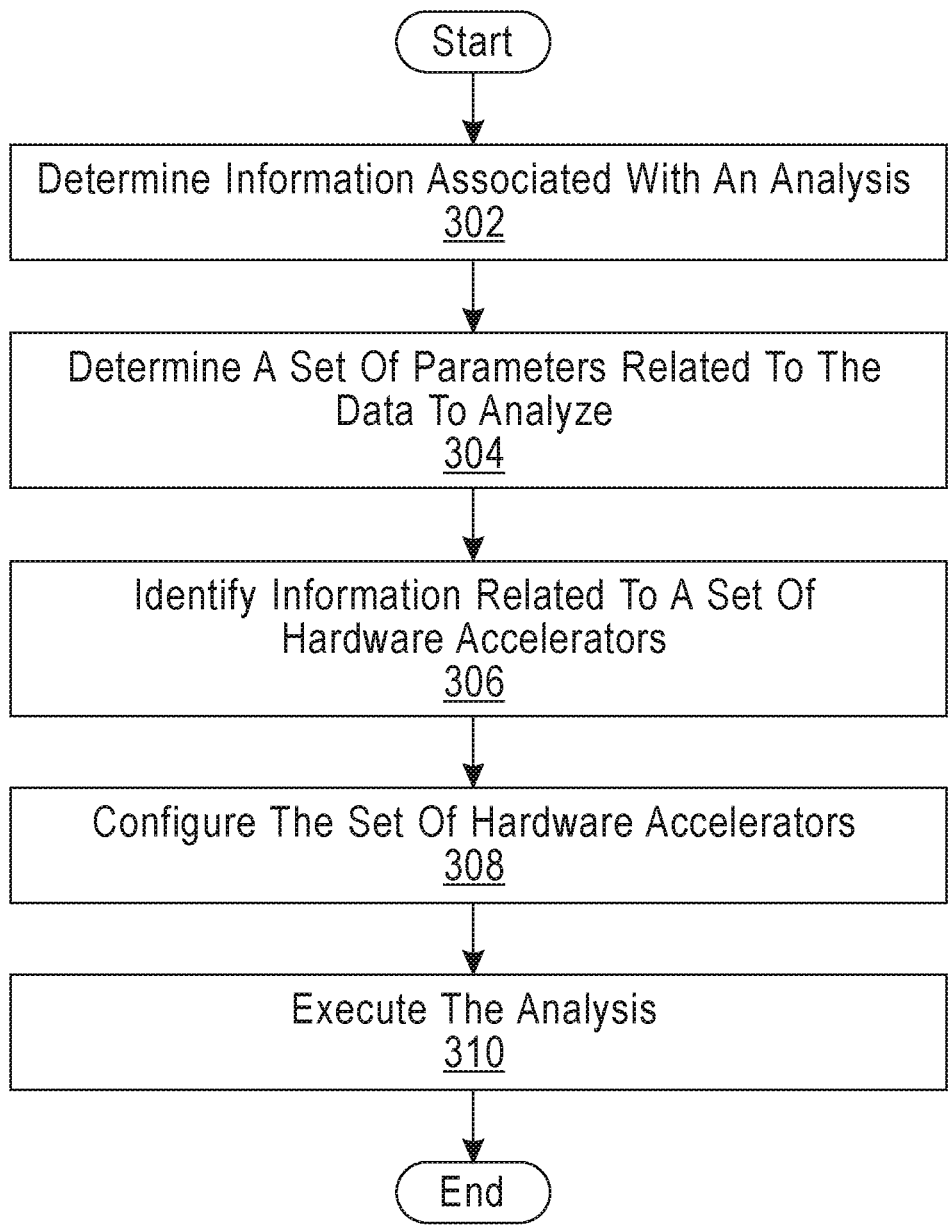
FIG. 3 depicts a flowchart of steps of a configuration program, in accordance with an embodiment of the present invention.

FIG. 3 is a flowchart depicting operational steps for configuration program 300, a program that analyzes the requirements of an analysis associated with a CNN and configures a plurality of computing systems and included accelerators to support processing data by the CNN, in accordance with embodiments of the present invention. In some embodiments, a client version of configuration program 300 can execute within a system within distributed computing environment 100 utilized to process one or more layers of a CNN.

In step 302, configuration program 300 determines information associated with an analysis. In an embodiment, configuration program 300 determines information associated with an analysis, such as a CNN algorithm to utilize; the structure of the CNN algorithm; a set of models corresponding to the layer; a kernel size, a stride increment, weight factors respectively associated with a set of models; kernel values (e.g., matrices) respectively associated with a level of data associated with a layer of the CNN, input data dictates, data source location(s), output dictates, etc. Additional information related to the CNN or the structure of the CNN include a number of neurons, a number of layers, tensor sizes, numbers of activations, trainable parameters, and non-trainable parameters.

In various embodiments, configuration program 300 determines information associated with an analysis based on information within algorithms 110 and/or information supplied by a user or computing entity, such as an AI program, an application programming interface call, a sematic query, a request for NLP, a machine vision program, processing of satellite images, genomic analyses, voice synthesizing, data classification, etc.

In step 304, configuration program 300 determines a set of parameters related to the data to analyze. In an embodiment, configuration program 300 determines a set of parameters related to the data to analyze such as the size and resolution of the original data to analyze within data 120, the depth of the data original data to be processed by a CNN, and other aspects associated with the data previously discussed with respect to FIG. 2, such as determining a number of PEs to assign and/or configure. In another embodiment, if data 120 has been distributed (e.g., broken up) among a plurality of segments, then configuration program 300 determines a set of parameters corresponding to each segment of the distributed data. For example, if the accelerators within distributed computing environment 100 memory are constrained and cannot store data 120 even in the fine-grained row/column scheme of the present invention, then either system 101 or configuration program 300 distributes data 120 into smaller segments.

In some embodiments, configuration program 300 determines additional parameters related to the data to analyze (e.g., original data, intermediated feature maps, results of analyses, etc.), such as model sizes and storage sizes associated with weight factors utilized by a layer of the CNN, which affects the on-chip memory requirements and can dictate the number of accelerators utilized for a respective layer of the CNN. In an example, configuration program 300 determines additional parameters related to respective layers of the CNN based on historical information included within algorithms 110 related to effects of an analysis, such as whether the analysis at a layer of the CNN changes the shape (e.g., dimensions) of an intermediate feature map, increases or decreases the resolution of an output of an analysis, pools and/or mergers data from various sources, etc.

In step 306, configuration program 300 identifies information related to a set of hardware accelerators. In an embodiment, configuration program 300 identifies information related to a set of hardware accelerators distributed among systems of distributed computing environment 100, such as system 130A through system 130N. In addition, configuration program 300 also identifies other hardware information related to system 130A through system 130N that can affect the operation of an accelerator or the execution of the CNN, such as the availability and quantities of other computing resources (e.g., processor cores, persistent memory, DDR memory, network bandwidth, advanced bus or interface architectures, etc.).

In one embodiment, configuration program 300 identifies information related to a set of hardware accelerators based on information stored within hardware information 102. In another embodiment, if configuration program 300 cannot identify information related to a hardware accelerator, then configuration program 300 queries one or more functions within a system, such as an SFM to identify the capabilities and characteristic of one or more hardware accelerators included within the system. Capabilities and characteristics corresponding to a hardware accelerator may include, a quantity and architecture of on-chip memory available for configuring one or more buffers, a number and type of PEs of the hardware accelerator (e.g., FPGA elements, GPU cores and GPU core types, etc.), a quantity of cache memory available for storing instructions, a quantity of cache memory for storing weight factors and other non-analyzed data, a quantity of off-chip DDR memory associated with the accelerator, etc.

In step 308, configuration program 300 configures a set of hardware accelerators. In one embodiment, configuration program 300 assigns and configures a set of hardware accelerators based on the information and parameters determined in step 302, step 304, and step 306 for a respective layer of a CNN and other information previously discussed with respect to at least FIG. 2. For example, with respect to a CNN layer that utilizes a 3×3 kernel and a stride increment of 1, configuration program 300 configures a memory buffer based on storing four data slices for each accelerator utilized at the CNN layer.

Configuration program 300 further configures the set of accelerators by assigning a number of PE equal to the "depth" of the data and assigning (e.g., allocating) a memory buffer, in KB s, based on the number of slices, a resolution of the feature map/data elements, and the number of feature map/data elements within a slice (e.g., height*# of levels). In addition, configuration program 300 configures on-chip cache memory (e.g., cache 217 of FIG. 2) of the set of accelerators utilized by the layer of the CNN based on the sizes of kernels, size of the models that process slices of data utilizing the respective kernels, and the size of weight factors, etc. Configuration program 300 may also configure off-chip DDR memory assigned to store the weight factors and other items related to the layer of the CNN.

In some embodiments, configuration program 300 also includes other factors related to distributed computing environment 100, in response to selecting and configuring hardware accelerators, such as historic latency information and CNN layer process times. In one example, configuration program 300 utilizes latency information to determine whether to buffer additional data slices at a set of accelerators for one CNN layer, and allocated an increased quantity of memory for the additional data slices. In another example, configuration program 300 utilizes latency information and/or computation speeds of models to determine the systems and/or accelerators that are assigned to process a layer of the CNN.

Still referring to step 308, in a further embodiment configuration program 300 selects a set of accelerators to assign to a layer of the CNN based on improving computational efficiencies associated with one or more models. In one scenario, with respect to an FPGA IC (not shown), configuration program 300 can utilize a function of a respective system, such as system 130A to dynamically configure (e.g., temporarily hardwire) and program the plurality semiconductor features within the FPGA to create one or more instances of PE array 215 optimized for one or more models of a CNN layer. In another scenario, with respect to an GPU IC (not shown), configuration program 300 utilizes a function of a respective system, such as system 130A can assign specialized GPU elements, such as vector processors to create one or more instances of PE array 215 optimized for one or more models of a CNN layer.

In step 310, configuration program 300 executes the analysis. In one embodiment, configuration program 300 begins executing an analysis by distributing the models, weight factors, and other items associated with a plurality of layers of a CNN (e.g., within at least algorithms 110, models 112, and weight factors 114) among the sets of configured accelerators within the systems of distributed computing environment 100. In various embodiments, configuration program 300 executes one or more aspects of analysis program 400 among the configured systems and respective accelerators of distributed computing environment 100. In another embodiment, configuration program 300 utilizes one or more aspects of system 101 to aggregate the outputs, analyses, feature maps, and/or results from analysis program 400 and/or one or more layers of the CNN to complete the processing and/or analysis of data 120 by a CNN.

In some embodiments, configuration program 300 utilizes one or more programs and information within system 101 to prioritize traffic associated with the CNN across network 140 and computing resource utilization among system 130A through system 130N that process the CNN. In a further embodiment, if distributed computing environment 100 is resource constrained, configuration program 300 can reconfigure one or more accelerators assigned to a prior layer of the CNN to process one or more intermediate feature maps by an unexecuted layer of the CNN.

Figure 4:
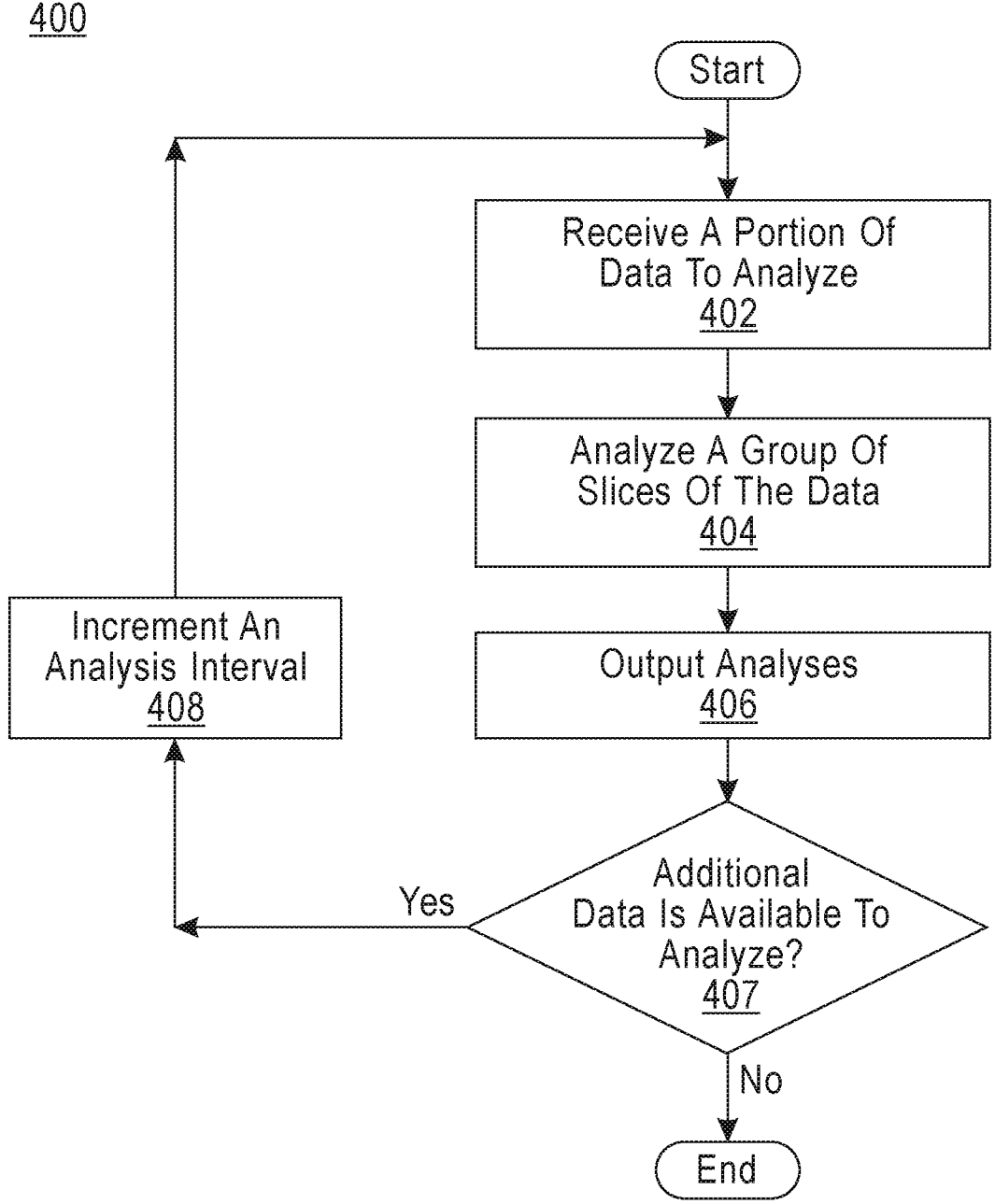
FIG. 4 depicts a flowchart of steps of an analysis program, in accordance with an embodiment of the present invention.

FIG. 4 is a flowchart depicting operational steps for analysis program 400, a program that controls the pipelining and analyses of data associated with accelerators utilized by a CNN, in accordance with embodiments of the present invention. In some embodiments, respective client instances of analysis program 400 executes concurrently within systems of distributed computing environment 100 utilized to process data for one or more layers of a CNN. In another embodiment, an instance of analysis program 400 is respectively associated with a layer of a CNN and can also interface with an instance of configuration program 300.

In step 402, analysis program 400 receives a portion of data to analyze. In one embodiment, analysis program 400 receives a number of slices of data (previously discussed with respect to FIG. 2) to one or more accelerators based on the width of the kernel plus the stride increment. For example, analysis program 400 receives four slices of data for a kernel of matrix size 3×3 and stride=1, or seven slices of data for a kernel of matrix size 5×5 and a stride=2. In another embodiment, analysis program 400 utilizes stride increments that vary within a layer of the CNN, such as stride increment of two between feature map elements of sequential data slices for vertical analyses, and a stride increment of 1 slice between sequential data slices in response to completing a group of vertical analyses.

In various embodiment, responsive to incrementing an analysis interval (step 408) analysis program 400 can receive one or more other slices of data to the accelerator. In one scenario, if data 120 or a segmented version of data 120 includes one or more slices that have not been processed by the assigned accelerator, then analysis program 400 receives a number of data slices to the assigned accelerator equal to the stride increment or horizontal stride increment. In another scenario, if the number of unreceived data slices is less that stride increment, then analysis program 400 receives the remaining data slices. System 101 may transmit one or more "0" padded slices to enable analysis program 400 to complete another kernel width of analyses.

In some embodiments, an instance of analysis program 400 receives a group of sequential data slices of data 120 (e.g., a subset of data) to an accelerator configured to process a layer of a CNN (FIG. 3 step 308). In one example, analysis program 400 determines that accelerator 132A receives slices N through N+3 of data 120. In other embodiments, an instance of analysis program 400 receives a segmented version of data 120, distributed among respective instances of storage 132A through storage 132N, each segment includes a plurality of data slices. In an example, system 130A receives data segments 1 through 5 (not shown) of data 120, and system 130N receives data segments 6 through 15 (not shown) of data 120. Analysis program 400 may dictate that groups of sequential data slices, corresponding to a data segment of data 120 are received by respective accelerators included within one or more systems. For example, slices N through N+3 of segment 1 are received by accelerator 132A-1 of system 130A, and slices N through N+3 of segment 7 are received by accelerator 132B-2 of system 130B.

Still referring to step 402, in another embodiment an instance of analysis program 400 supporting another stage of the CNN receives one or more intermediate feature maps/results for analysis from a plurality of process elements and/or accelerators of a prior level of the CNN. In one scenario, analysis program 400 receives complete slices of intermediate feature maps/results from the prior layer of the CNN. In other scenarios, analysis program 400 receives a one or more elements of a feature map from a plurality of PEs and/or accelerators of a prior level of the CNN. Subsequently, analysis program 400 assembles the received feature map elements into data slices based on the structure of a feature map related to the layer of CNN to process.

In step 404, analysis program 400 analyzes a group of slices of data. In an embodiment, a group of analyses corresponding to a group of slices refers to at least a convolutional operation, such as a matrix math or other dot product operation that applies values within a matrix of a kernel respectively associated with a level of data, and further with respect to the current layer of the CNN to a plurality of feature map/data elements within a group of data slices. Analysis program 400 utilizes assigned PEs of an accelerator to perform various analyses among a group of sequential (e.g., consecutive) data slices based on the data level assigned to a PE of the accelerator. In some embodiments, analysis program 400 analyzes feature map/data elements within a group of slices of data received to an accelerator based on information and actions previously discussed with regard to FIG. 2. In some embodiments, analysis program 400 utilizes (e.g., swaps out) differing weight factors related to other portions of an analysis between on-chip memory and DDR memory (not shown) of an accelerator for a respective system as different levels and/or portions of the data are processed by the accelerator.

In other embodiments, in response to executing one or more kernel-based operations among a set of feature map/data elements within a sequential group of data slices, analysis program 400 further utilizes one or more models of models 112 and related weight factors of weight factors 114 related to the layer of the CNN to perform additional operations associated with the group of analyses for the set of feature map/data elements. In various embodiments, in response to releasing a stride-value number of processed data slices (e.g., slice N) and receiving a stride-value number of new (e.g., sequential) data slices, such as slice N+4. In an embodiment, analysis program 400 performs analyzes unidirectionally (e.g., top-down), for another group of slices utilizing the assigned PEs of the accelerator, such as data slices N+1, N+2, and N+3.

In step 406, analysis program 400 outputs analyses. In some embodiments, analysis program 400 pipelines the results of analyses (e.g., intermediate feature maps) related to a group of data slices to one or more neurons/nodes of the CNN and included accelerators based on the structure of the CNN. In an embodiment, as one or more models of the current CNN layer generate results (e.g., intermediate feature maps) of an analysis, analysis program 400 can pipeline feature maps to the subsequent (i.e., next) layer of the CNN asynchronously. In another embodiment, the last (e.g., final) layer of the CNN outputs one or more results based on the original input data and the plurality of layers of the CNN. Analysis program 400 may transmit the final results to system 101 or a computing entity that requested the execution of the CNN.

In various embodiments, in addition to pipelining the analyses corresponding to a group of consecutive data slices, analysis program 400 clears and releases the portion of memory corresponding to the lowest number (e.g., index value) data slice of the processed group of consecutive data slices from a memory buffer (not shown) of a utilized accelerator. For example, in response to completing the analyses corresponding to data slices 5, 6, and 7, analysis program 400 dequeues data slice 5 and releases the buffer memory for reuse by a subsequent data slice.

In decision step 407, analysis program 400 determines whether additional data is available to analyze. In one embodiment, analysis program 400 determines that additional data is available to analyze for a layer of a CNN based on receiving one or more additional slices of data 120 from system 101. In another embodiment, analysis program 400 determines that additional data is available to analyze for a layer of a CNN based on determining that the width (e.g., X-axis) value of a data segment in process is at least a value of one greater than value of the highest slice number of the group of slices analyzed at step 404. In some embodiments, analysis program 400 determines that additional data is available to analyze based on a dictate that "0" padding slices are included at the beginning and end of the data.

Responsive to determining that additional data is available to analyze (Yes branch, decision step 407), analysis program 400 increments an analysis interval (step 408).

In step 408 analysis program 400 increments an analysis interval. In one embodiment, analysis program increments an analysis interval related to a group of slices by the value of the stride increment associated with a kernel-analysis increment. In another embodiment, analysis program increments an analysis interval related to a group of slices by a dictated stride increment. In some embodiment, responsive to incrementing an analysis interval, analysis program 400 can also indicate to a data source or data storage location, such as storage 131A of system 130A, to transmit at least a stride increment value number of subsequent slices of data, or subsequent slices of a data segment.

Referring to decision step 407, responsive to determining that additional data is not available to analyze, (No branch, decision step 407) the instance of analysis program 400 associated with at least the respective data segment and the current layer of the CNN terminates.

Figure 5:
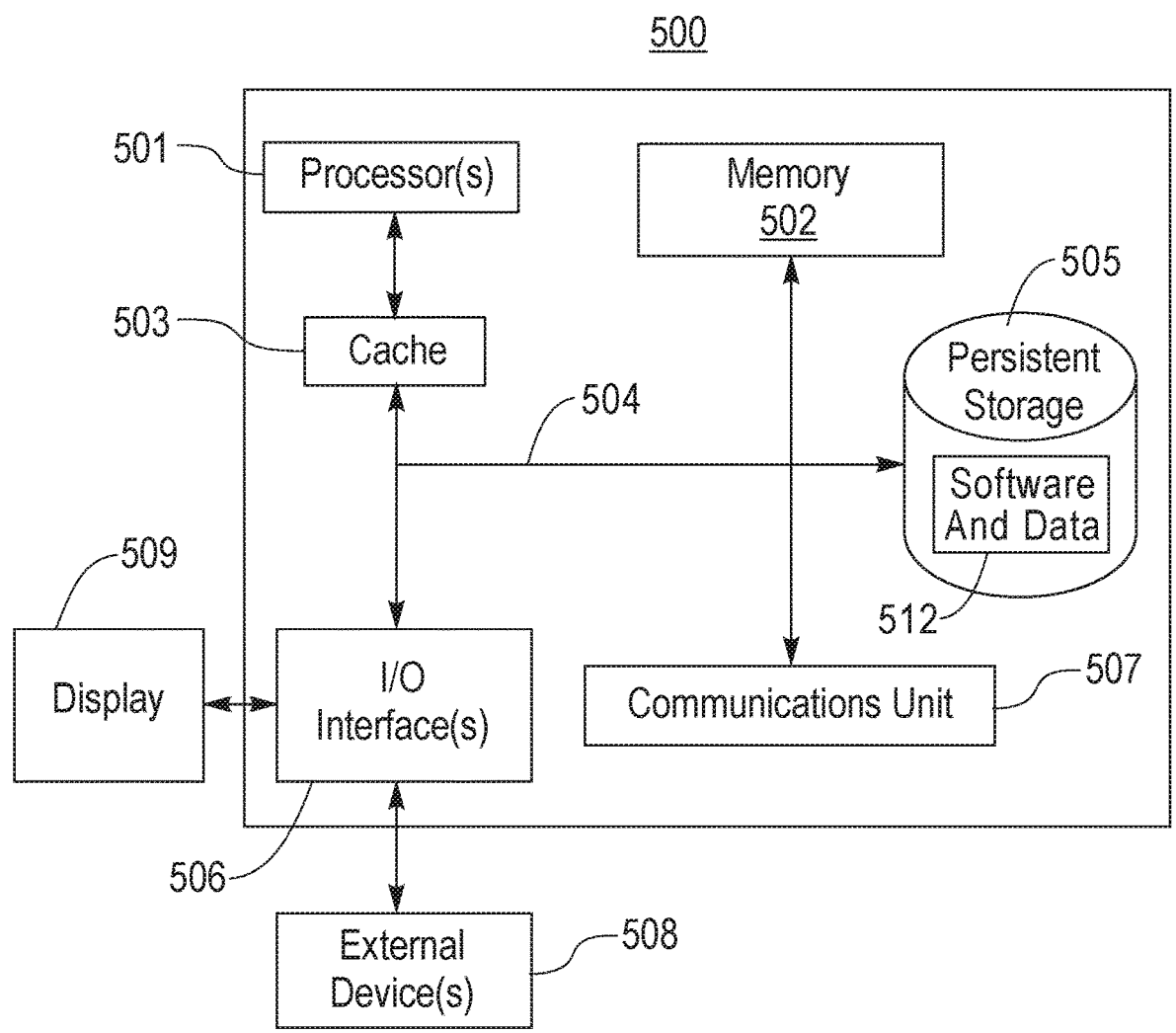
FIG. 5 is a block diagram of components of a computer, in accordance with an embodiment of the present invention.

FIG. 5 depicts computer system 500, which is representative of system 101 and system 130A through system 130N. Computer system 500 is an example of a system that includes software and data 512. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. In some embodiments, one or more of accelerator 132A through accelerator 132N also include one or more components of computer system 500.

Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random-access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. In one example, a removable hard drive may be used for persistent storage 505. Other examples include optical and magnetic disks, thumb drives, smart cards that are inserted into a drive for transfer onto another computer readable storage medium that is also part of persistent storage 505.

Software and data 512 are stored in persistent storage 505 for access and/or execution by one or more of the respective processor(s) 501 via cache 503 and one or more memories of memory 502. With respect to system 101, software and data 512 includes hardware information 102, algorithms 110, models 112, weight factors 114, configuration program 300, analysis program 400, and other programs and data (not shown). With respect to system 130A through system 130N, software and data 512 includes various and programs (not shown) that are utilized to operate system 130A through system 130N and data related to the current invention.

Communications unit 507, in these examples, provides for communications with other data processing systems or devices, including resources and program executing on the Internet (not shown). In these examples, communications unit 507 includes one or more network interface cards. Communications unit 507 may provide communications, through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface (s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a sequence of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more computer processors, a set of parameters related to a feature map to analyze at a respective layer of a convolutional neural network (CNN), wherein the set of parameters related to the feature map includes a quantization value; and respective values for a first dimension, a second dimension, and a third dimension, which correspond to a shape describing the feature map;
   configuring, by one or more computer processors, a set of hardware accelerators for the respective layer of the CNN;
   receiving, by one or more computer processors, a portion of the feature map to the configured set of hardware accelerators for the respective layer of the CNN, wherein the received portion of the feature map includes a group of sequential data slices, and wherein the group of sequential data slices is based, at least in part, on a number of sequential data slices equal to a value corresponding to a kernel size plus a value corresponding to stride increment value corresponding to the respective layer of the CNN; and
   analyzing, by one or more computer processors, the group of sequential data slices among the configured set of hardware accelerators.

2. The method of claim 1: further comprising:
   determining, by one or more computer processors, information associated with an analysis related to the CNN, wherein:
   (i) the information associated with the analysis related to the CNN includes information respectively associated with a layer of a plurality of layers of the CNN, and
   (ii) the information respectively associated with the layer of the CNN includes a kernel size, a stride increment value, and information related to a plurality of kernel matrices, models, and weight factors utilized by one or more analyses performed at the layer of the CNN.

3. The method of claim 1, wherein:
   (i) the quantization value is a value in bits related to a resolution of a plurality of elements that comprise the feature map to analyze;

(ii) a value of the first dimension corresponds to a number of elements associated with a width dimension of the feature map to analyze;

(iii) a value of the second dimension corresponds to a number of elements associated with a height dimension of the feature map to analyze; and (iv) a value of the third dimension corresponds to a number of levels associated with a depth dimension of the feature map to analyze.

4. The method of claim 3, wherein a level of the feature map to analyze is associated with a respective filter of a plurality of filters utilized to generate the feature map.

5. The method of claim 1, wherein configuring the set of hardware accelerators to process the respective layer of the CNN further comprises:

identifying, by one or more computer processors, based on the determining information associated with the analysis related to the CNN, a kernel size and a stride increment value corresponding to the respective layer of the CNN; and allocating, by one or more computer processors, a quantity of memory for respective memory buffers within the set of hardware accelerators based on the kernel size, the stride increment value; and the determined quantization value and the value corresponding to the third dimension of the feature map associated with the respective layer of the CNN.

6. The method of claim 1, wherein configuring set of hardware accelerators for the respective layer of the CNN further comprises:

allocating, by one or more computer processors, a quantity of respective process elements within the set of hardware accelerators based on the value corresponding to the third dimension of the feature map associated with the respective layer of the CNN.

7. A computer program product, the computer program product comprising:

one or more computer readable storage media and program instructions stored on the one or more computer readable storage media, the program instructions readable/executable by one or more computer processors:

program instructions to determine a set of parameters related to a feature map to analyze at a respective layer of a convolutional neural network (CNN), wherein the set of parameters related to the feature map includes a quantization value; and respective values for a first dimension, a second dimension, and a third dimension, which correspond to a shape describing the feature map;

program instructions to configure a set of hardware accelerators for the respective layer of the CNN;

program instructions to receive a portion of the feature map to the configured set of hardware accelerators for the respective layer of the CNN, wherein the received portion of the feature map includes a group of sequential data slices, and wherein the group of sequential data slices is based, at least in part, on a number of sequential data slices equal to a value corresponding to a kernel size plus a value corresponding to stride increment value corresponding to the respective layer of the CNN; and program instructions to analyze the group of sequential data slices among the configured set of hardware accelerators.

8. The computer program product of claim 7: further comprising:

program instructions to determine information associated with an analysis related to the CNN, wherein:

(i) the information associated with the analysis related to the CNN includes information respectively associated with a layer of a plurality of layers of the CNN, and (ii) the information respectively associated with the layer of the CNN includes a kernel size, a stride increment value, and information related to a plurality of kernel matrices, models, and weight factors utilized by one or more analyses performed at the layer of the CNN.

9. The computer program product of claim 7, wherein:

(i) the quantization value is a value in bits related to a resolution of a plurality of elements that comprise the feature map to analyze;

(ii) a value of the first dimension corresponds to a number of elements associated with a width dimension of the feature map to analyze;

(iii) a value of the second dimension corresponds to a number of elements associated with a height dimension of the feature map to analyze; and (iv) a value of the third dimension corresponds to a number of levels associated with a depth dimension of the feature map to analyze.

10. The computer program product of claim 9, wherein a level of the feature map to analyze is associated with a respective filter of a plurality of filters utilized to generate the feature map.

11. The computer program product of claim 7, wherein program instructions to configure the set of hardware accelerators to process the respective layer of the CNN further comprise:

program instructions to identify, based on the determining information associated with the analysis related to the CNN, a kernel size and a stride increment value corresponding to the respective layer of the CNN; and program instructions to allocate a quantity of memory for respective memory buffers within the set of hardware accelerators based on the kernel size, the stride increment value; and the determined quantization value and the value corresponding to the third dimension of the feature map associated with the respective layer of the CNN.

12. The computer program product of claim 7, wherein program instruction to configure the set of hardware accelerators for the respective layer of the CNN further comprises:

program instructions to allocate a quantity of respective process elements within the set of hardware accelerators based on the value corresponding to the third dimension of the feature map associated with the respective layer of the CNN.

13. A computer system, the computer system comprising:
one or more computer processors;
one or more computer readable storage media; and
program instructions stored on the computer readable storage media for execution by at least one of the one or more computer processors, the program instructions comprising:

program instructions to determine a set of parameters related to a feature map to analyze at a respective layer of a convolutional neural network (CNN), wherein the set of parameters related to the feature map includes a quantization value; and respective values for a first dimension, a second dimension, and a third dimension, which correspond to a shape describing the feature map;

program instructions to configure a set of hardware accelerators for the respective layer of the CNN;
program instructions to receive a portion of the feature map to the configured set of hardware accelerators for the respective layer of the CNN, wherein the received portion of the feature map includes a group of sequential data slices, and wherein the group of sequential data slices is based, at least in part, on a number of sequential data slices equal to a value corresponding to a kernel size plus a value corresponding to stride increment value corresponding to the respective layer of the CNN; and
program instructions to analyze the group of sequential data slices among the configured set of hardware accelerators.

14. The computer system of claim 13: further comprising:
program instructions to determine information associated with an analysis related to the CNN, wherein:
(i) the information associated with the analysis related to the CNN includes information respectively associated with a layer of a plurality of layers of the CNN, and
(ii) the information respectively associated with the layer of the CNN includes a kernel size, a stride increment value, and information related to a plurality of kernel matrices, models, and weight factors utilized by one or more analyses performed at the layer of the CNN.

15. The computer system of claim 13, wherein:
(i) the quantization value is a value in bits related to a resolution of a plurality of elements that comprise the feature map to analyze;
(ii) a value of the first dimension corresponds to a number of elements associated with a width dimension of the feature map to analyze;
(iii) a value of the second dimension corresponds to a number of elements associated with a height dimension of the feature map to analyze; and
(iv) a value of the third dimension corresponds to a number of levels associated with a depth dimension of the feature map to analyze.

16. The computer system of claim 13, wherein program instructions to configure the set of hardware accelerators to process the respective layer of the CNN further comprise:
program instructions to identify, based on the determining information associated with the analysis related to the CNN, a kernel size and a stride increment value corresponding to the respective layer of the CNN; and
program instructions to allocate a quantity of memory for respective memory buffers within the set of hardware accelerators based on the kernel size, the stride increment value; and the determined quantization value and the value corresponding to the third dimension of the feature map associated with the respective layer of the CNN.

17. The computer system of claim 13, wherein program instruction to configure the set of hardware accelerators for the respective layer of the CNN further comprises:
program instructions to allocate a quantity of respective process elements within the set of hardware accelerators based on the value corresponding to the third dimension of the feature map associated with the respective layer of the CNN.

* * * * *